Sept. 29, 1959  R. G. D'ASCOLI  2,906,810
INSULATED ELECTRIC CONDUCTOR SPLICE
Filed Feb. 15, 1956

INVENTOR
RALPH GREGORY D'ASCOLI
BY
Pennie, Edmonds, Morton, Barrows & Taylor
ATTORNEYS

2,906,810
INSULATED ELECTRIC CONDUCTOR SPLICE

Ralph G. D'Ascoli, Yonkers, N.Y., assignor to Anaconda Wire and Cable Company, a corporation of Delaware Application February 15, 1956, Serial No. 565,656

7 Claims. (Cl. 174—87)

This invention relates to the splicing of insulated electric conductors, and more particularly to the splicing of an insulated bridge conductor to an insulated through conductor, as for example in telephone cables. The invention aims to provide certain improvements in such splices and water-proof enclosures therefor.

The splice of the invention comprises essentially a cylindrical capsule having one end closed and the other end open, a cylindrical plug serving as a separator, plunger and stopper securely fitted within the capsule near its open end, and a mass of plastic waterproof insulating material filling the capsule and surrounding and embedding the twisted stripped ends of the spliced conductors. The unstripped end portions of the spliced conductors extend through circumferentially spaced peripheral grooves along the cylindrical surface of the plug to a short distance within the capsule, and preferably converge abruptly from the grooves to the twisted stripped ends of the conductors, with the space between the inner face of the plug and the adjacent twisted stripped ends of the conductors being about one-quarter of an inch.

The invention further contemplates a novel waterproof enclosure for a plurality of splices of the invention, as for example where individual insulated conductors of a through telephone cable are spliced to individual insulated conductors of a bridge cable. The several splices are covered with suitable insulating material, such as a wrapping of friction tape, and enclosed within a cylindrical tube of an insulating plastic closed at its opposite ends by cylindrical plastic collars each extending a short distance beyond the end of the tube. Each of the collars is made of mating half cylinders bolted or otherwise suitably secured together and having a longitudinal opening through which the through cable extends. One of the collars has another longitudinal opening through which the bridge cable extends. The tube and extending ends of the collar are surrounded by a water-proofing compound.

Figure 3:
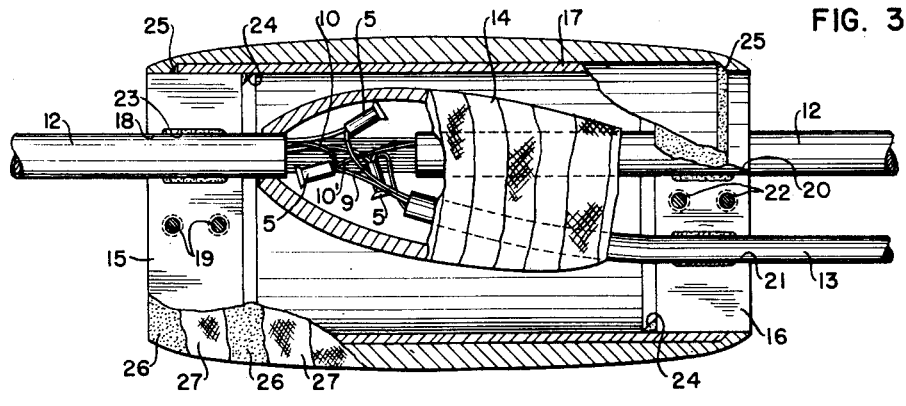
Figure 1:
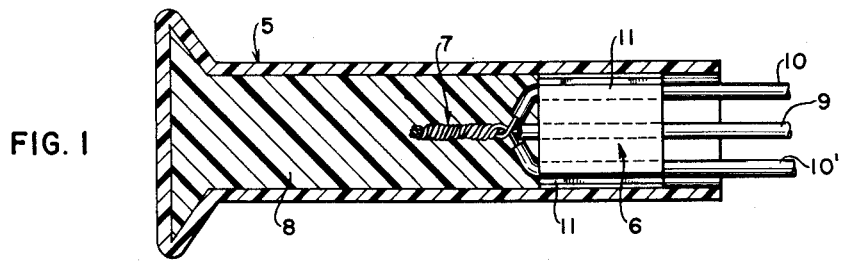
Figure 4:
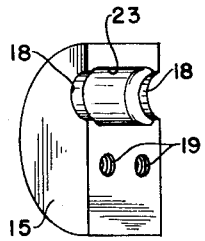
Figure 2:
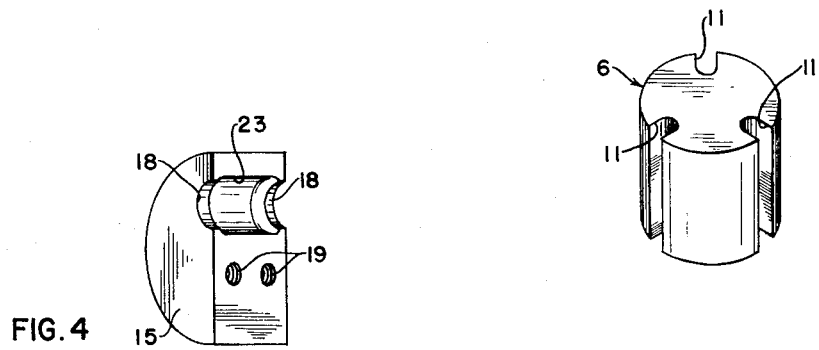

The foregoing and other novel features of the invention will be better understood from the following description taken in conjunction with the accompanying drawing, in which Fig. 1 is a sectional view of an insulated splice embodying the invention, Fig. 2 is a perspective view of the closing plug of the insulated splice, Fig. 3 is a sectional view of a waterproof cable junction for several splices of the invention, and Fig. 4 is a perspective view of one of the mating halves of an end-closure collar for the cable junction of Fig. 3.

In general, the insulated splice of the invention (Fig. 1) comprises a cylindrical capsule 5, a cylindrical closing plug 6, and the twisted stripped ends 7 of the spliced conductors embedded in a mass 8 of plastic waterproof insulating material. For purposes of illustration, the drawings show an insulated bridge conductor 9 spliced to an insulated through conductor 10—10', which has been cut to provide two end portions for stripping and splicing. The insulated conductors 9 and 10—10' are positioned in peripheral grooves 11 extending longitudinally along the cylindrical surface of the plug 6 and circumferentially spaced 120° apart.

The position of the conductors 9 and 10—10' in the grooves 11 is such that the insulating sheaths of the conductors extend a short distance beyond the inner face or end of the plug 6 with the twisted splice 7 close to this end of the plug. Advantageously, the short insulated portions of the conductors beyond the inner end of the plug are taut and converge abruptly from the grooves 11 to the splice 7.

The capsule 5 is preferably made of an insulating plastic, while the plug 6 may be made of plastic, wood, metal, rubber or other suitable material. Very satisfactory practical results have been achieved with capsules and plugs made of cellulose acetate butyrate and particularly with Tenite II a cellulose acetate butyrate product marketed by Tennessee Eastman Co. The plastic insulating material 8 is preferably the putty-like plastic composition described and claimed in my copending patent application Ser. No. 550,470, filed Dec. 1, 1955. As a telephone cable splice the capsule may advantageously be about 2⅛ inches in length and about ⅜ inch internal diameter, and the plug may be about ½ inch in length with an outside diameter substantially the same as the internal diameter of the capsule.

In making the splice, the stripped ends of the insulated conductors are twisted to make an effective conducting contact, and the insulated end portions of the conductors are positioned in the grooves 11 of the plug 6 as hereinbefore described with the inner end of the plug spaced about ¼ inch from the adjacent twisted stripped ends (7) of the conductors. The capsule 5 is filled to within about ⅝ inch of its open end with the putty-like plastic composition 8. This composition is the reaction product resulting from heating to a temperature within the range of 200 to 400° F. a mixture made up essentially of 30 to 50% by weight of mineral oil, 2 to 7% by weight of polyisobutylene having a molecular weight between 50,000 and 150,000, 15 to 20% by weight of polyethylene and 30 to 40% of methylated paraffin; more fully described in my aforementioned patent application. The plug 6 is inserted in the open end of the capsule and into ramming contact with the plastic composition 8 to force the composition around the splice.

The plug 6 functions as a plunger, separator and stopper. After the plug has been inserted in the capsule and makes contact with the composition therein, it acts as a plunger or ram to force the composition around the twisted stripped ends of the conductors and between and around the short unstripped portions of the conductors adjacent the plug and beyond the grooves 11. The plug serves to separate the short unstripped portions of the conductors within the capsule, thus allowing clearance for the composition to get between the conductors and encase them. When all portions of the conductors within the capsule are completely surrounded by and embedded in the composition, the plug serves as a stopper to maintain the parts within the capsule securely in position.

Fig. 3 of the drawing shows an insulated telephone through cable 12 with three splices of the invention (indicated by the capsules 5) connecting individual insulated conductors (e.g. 10—10') of the cable to individual insulated conductors (e.g. 9) of an insulated bridge cable 13. The splices and the exposed portions of the individual insulated conductors of both the through and bridge cables are covered by a wrapping of friction tape 14 which in turn is enclosed in a waterproof cable junction enclosure. Essentially, the junction enclosure comprises two plastic cylindrical collars 15 and 16 and a cylindrical tube 17 of sheet plastic or metal. The collars 15 and 16 are slit in half to provide two mating semi-cylinders. Each half of the collar 15 (Fig. 4) has a longitudinal semi-circular opening 18 parallel to the axis, and two transverse bolt holes 19. When assembled, the mating semicircular openings 18 have a diameter just slightly greater (e.g. 0.02 inch greater) than the diameter of the through cable. Similarly, the mating halves of the collar 16 have two mating openings 20 and 21 parallel to the axis and of just slightly greater diameter than the diameters of the through and bridge cables, respectively, and two transverse mating bolt holes 22.

The junction enclosure is assembled by bolting together the two mating halves of the collars 15 and 16 with the cables 12 and 13 extending through their respective openings and the tape-wrapped splices between the two collars. Each of the cable openings 18, 20 and 21 has, intermediate the ends of its collar, a slight recess (e.g. 23 in collar 15) which is filled with the aforementioned plastic composition prior to assembly of the collar halves and cables. The outside cylindrical surfaces of the collars are smeared with the aforementioned plastic composition of low viscosity and a sheet of plastic (or metal) is wrapped around the collars with the overlapping edges sealed to form the cylindrical tube 17. An annular layer 24 of the smearing plastic composition is forced into the corner junctions of the tube and the inner faces of the collars. The ends of the tube 17 terminate some distance short of the ends of the collars 15 and 16, say 1 inch short of these ends where the collars are about 3 inches long and about 2¼ inches in diameter. With such collars, the depth of the recesses 23 may advantageously be about 0.06 inch, they may terminate ⅛ inch short of each end of the collar, and be initially filled with the composition to a depth at least 0.02 inch greater than the depth of the recess. The edges of the tube around the collars are provided with an application of the plastic composition 25, and the assembly is finally covered with one or more alternating layers of a weatherproofing compound 26 and friction tape 27.

The splice of the invention is of particular advantage with conductors insulated with polyethylene and the plastic insulating composition of my aforesaid patent application. The surface of polyethylene is of a waxy nature, and the plastic insulating composition possesses the advantageous property of remarkably strong adherence to polyethylene. Thus, a practically perfect bond is attained between the conductor insulation and the composition. The composition also adheres strongly to other plastics, to metal, rubber, wood, etc., so that practically perfect bonds are attained between the composition and the inside wall of the capsule, the inner face of the plug and the twisted stripped ends of the conductors.

Splices made in accordance with the invention (Fig. 1) have been immersed in water at room temperature and at 50° C. for many weeks (tests discontinued) without evidencing any failures. A failure constitutes an internal resistance reading less than infinite. Similarly the cable junction enclosure (Fig. 3) has been immersed in water at 50° C. for indefinite periods of time with no evidence of water within the enclosure.

I claim:

1. In a splice for an insulated electric conductor, the improvement which comprises a cylindrical capsule having one end closed and the other end open, a cylindrical plug securely fitted within and forming a stopper for the capsule near its open end, said plug having a plurality of circumferentially spaced peripheral grooves extending longitudinally along its cylindrical surface, an insulated electric conductor extending through each of said grooves into said capsule, the ends of said conductors within the capsule being stripped of insulation up to a short distance from the inner face of the plug, whereby insulation is retained on each conductor for said short distance beyond the inner face of the plug, the unstripped portion of the conductors within the capsule being held separated by said plug, the stripped ends of said conductors being twisted into effective electrical contact, and a plastic insulating composition completely filling said capsule between its closed end and said plug, completely surrounding and embedding the twisted stripped ends and the aforesaid short insulated lengths of the conductors within the capsule, and closing the ends of the grooves around the conductors and the space between the periphery of the plug and the inner end of the capsule at the inner end of the plug to form a watertight seal.

2. The improvement according to claim 1 in which the capsule is made of cellulose acetate butyrate.

3. The improvement according to claim 1 in which the plastic insulating composition is the reaction product resulting from heating a mixture made up essentially of mineral oil, polyisobutylene, polyethylene and methylated paraffin.

4. The improvement according to claim 3 in which at least the outer insulation of the conductors consists essentially of polyethylene.

5. The improvement according to claim 1 in which the short insulated portions of the conductors within the capsule converge abruptly from the grooves to the twisted stripped ends thereof and the space between the inner face of the plug and the adjacent twisted stripped ends of the conductors is about one-fourth of an inch.

6. In a cable junction enclosure, a plurality of splices electrically connecting individual-insulated electric conductors of a through cable to individual insulated electric conductors of a bridge cable, each of said splices comprising a cylindrical capsule having one end closed and the other end open, a cylindrical plug securely fitted within and forming a stopper for the capsule near its open end, said plug having a plurality of circumferentially spaced peripheral grooves extending longitudinally along its cylindrical surface, an insulated conductor extending through each of said grooves into said capsule, the ends of said conductors within the capsule being stripped of insulation up to a short distance from the inner face of the plug, whereby insulation is retained on each conductor for said short distance beyond the inner face of the plug, the unstripped portion of the conductors within the capsule being held separated by said plug, the stripped ends being twisted into effective electrical contact, and a plastic insulating composition completely filling said capsule between its closed end and said plug, completely surrounding and embedding the twisted stripped ends and the aforesaid short insulated lengths of the conductors within the capsule and closing the ends of the grooves around the conductors and the space between the periphery of the plug and the inner end of the capsule at the inner end of the plug to form a watertight seal, and a waterproof enclosure for said splices comprising a cylindrical tube of an insulating plastic surrounding said plurality of splices and closed at its opposite ends by cylindrical collars each inserted therewithin and extending a short distance beyond the adjacent end of the tube, each of said collars consisting of two mated half cylinders secured together and having a longitudinal opening through which the through cable extends, one of said collars having another longitudinal opening through which the bridge cable extends, and a waterproofing compound surrounding the tube and the exposed ends of said collars in adherence therewith.

7. The enclosure according to claim 6, further characterized in that each of the longitudinal cable openings in said collars has a recess intermediate the ends of the collars, and a plastic insulating composition filling each of said recesses.

(References on following page)

References Cited in the file of this patent

UNITED STATES PATENTS

| | | |
|---|---|---|
| 997,066 | Krannichfeldt | July 4, 1911 |
| 1,297,614 | Van Viersen | Mar. 18, 1919 |
| 1,896,581 | Hagedorn et al. | Feb. 7, 1933 |
| 1,933,555 | Jasper | Nov. 7, 1933 |
| 2,576,227 | Hutchins | Nov. 27, 1951 |
| 2,621,228 | Tompers | Dec. 9, 1952 |
| 2,634,314 | Netherwood | Apr. 7, 1953 |
| 2,681,398 | Kozacka et al. | June 15, 1954 |

FOREIGN PATENTS

| | | |
|---|---|---|
| 823,809 | France | Oct. 25, 1937 |
| 495,127 | Great Britain | Nov. 8, 1938 |